United States Patent [19]

Rock et al.

[11] 4,396,087

[45] Aug. 2, 1983

[54] AUXILIARY DRIVE SYSTEM FOR COMBINES

[75] Inventors: Merlin A. Rock, Bettendorf, Iowa; Eugene J. Krukow, Cordova, Ill.; Vernon G. Moon, Orion, Ill.; Norman G. Stroup, Orion, Ill.; James C. Teichmer, Spokane, Wash.

[73] Assignee: International Harvester Co., Chicago, Ill.

[21] Appl. No.: 257,281

[22] Filed: Apr. 24, 1981

[51] Int. Cl.³ .................... B60K 17/34; F16H 39/46
[52] U.S. Cl. .................................... 180/243; 56/10.2; 60/420; 60/452; 172/2; 180/306; 180/307; 180/308
[58] Field of Search ............... 180/242, 243, 245, 233, 180/14 A, 307, 306, 63, 235, 247, 308; 60/484, 420, 422, 426, 427, 452; 172/2, 3, 45; 56/10.2; 37/DIG. 1, DIG. 19, DIG. 20

[56] References Cited

U.S. PATENT DOCUMENTS

| 3,053,043 | 9/1962 | Knowler | 60/426 X |
|---|---|---|---|
| 3,339,660 | 9/1967 | Budzich | 180/243 |
| 3,354,978 | 11/1967 | Budzich | 180/243 |
| 3,736,632 | 6/1973 | Barrow | 29/594 X |
| 3,841,423 | 10/1974 | Holtkamp et al. | 180/6.3 |
| 3,894,606 | 7/1975 | Hunck et al. | 180/307 X |
| 3,900,075 | 8/1975 | Chichester et al. | 180/6.3 |
| 3,902,566 | 9/1975 | Bird | 180/306 |
| 3,916,625 | 11/1975 | Holtkamp | 180/242 X |
| 3,918,546 | 11/1975 | Chichester et al. | 180/306 X |
| 4,102,425 | 7/1978 | Marsden et al. | 180/242 |
| 4,236,595 | 12/1980 | Beck et al. | 180/307 X |

FOREIGN PATENT DOCUMENTS

56-112327  9/1981  Japan ................ 180/243

Primary Examiner—Joseph F. Peters, Jr.
Assistant Examiner—Mitchell J. Hill
Attorney, Agent, or Firm—Dennis K. Sullivan; F. David Au Buchon

[57] ABSTRACT

A self propelled combine having forward main drive wheels and rear steerable wheels. A hydrostatic drive including a variable displacement motor is arranged to drive the main drive wheels. An electronic-hydraulic control system is automatically operable to drive the rear steerable wheels in response to sensing preselected pressure and combine attitude values while automatically varying the displacement of the hydrostatic drive motor to minimize combine speed changes and to provide torque as required under varying loads imposed by hilly terrain or increasing amounts of grain collected in the grain tank of the combine.

30 Claims, 4 Drawing Figures

4,396,087

AUXILIARY DRIVE SYSTEM FOR COMBINES

BACKGROUND OF THE INVENTION

1. Field of the Invention

The invention relates generally to improved drive systems for vehicles and more particularly to an improved hydrostatic drive system for a combine particularly adapted for use in hilly terrain.

2. Prior Art

It is well known in the art of hydrostatic drive systems to include motors of variable displacement whose torque output can be controlled. Examples of such drives are shown in U.S. Pat. Nos. 3,734,225; 3,637,036; 3,595,334 and 3,587,765. Of these patents '225 and '334 use pressure responsive means for varying motor displacement and the torque output of the motor.

Auxiliary drive systems for combines are shown in U.S. Pat. Nos. 4,140,196 and 3,736,732, but using fixed displacement motors. Auxiliary drive systems having electrical controls are shown in U.S. Pat. Nos. 4,177,870; 4,027,738 and 3,894,606, but using fixed displacement motors.

Earlier attempts by the assignee herein to develop automatic shifting from two wheel drive to four wheel drive for combines brought several problems to light. Excessive pressure spikes were induced in the hydrostatic system when shifting from two to four wheel drive and back to two wheel drive. Such pressure spikes can damage system components such as hoses and seals. Perhaps the overriding problem with earlier systems was that the machine operator experienced excessive deceleration and acceleration in shifting from two to four wheel drive and four to two wheel drive, respectively.

In developing an effective drive system for combines, special factors are involved such as the increasing load on the combine as grain is collected in the grain tank during harvesting. Where the combine is destined for principal use in harvesting crops on hilly terrain (such as wheat in eastern Washington State), the function of a drive system takes on particularly important considerations of operator and vehicle safety. That is, the degree of slope traversed by so-called "hillside" combines can require maximum tractive effort not only to move the combine, but to assist in preventing downhill side slip of the machine. When such factors are involved, safety of operation is enhanced where the drive system can automatically respond to conditions or to the requirements of the operator.

SUMMARY

The invention provides an improved vehicle drive system having a variable displacement motor, the displacement of which is automatically controlled in response to actuation and deactuation of an auxiliary drive. The improved drive system further includes means for automatically deactuating the auxiliary drive when the vehicle assumes a forward climb angle less than a predetermined minimum, as when the vehicle approaches the crest of a hill, requiring less torque. The drive system of the invention provides a smoother transition in vehicle speed change as the auxiliary drive is engaged and disengaged.

The invention includes an electronic sensing and control system for effectively controlling the operation of the drive system while permitting operator override of automatic control inputs when desired or required.

The drive system of the invention reduces the pressure spikes induced within prior systems during shifting into and out of auxiliary drive. The result is less damage and wear on system components. The drive system minimizes acceleration and deceleration of the vehicle during shifting. Lastly, the system is particularly adapted to the requirements of hillside harvesting.

Briefly, the objects of the invention are to provide a vehicle drive system which minimizes vehicle speed change during shift into and out of auxiliary drive; which is automatically responsive to changing torque requirements; which is particularly well adapted for operation on hilly terrain; which permits the operator to assume control where it is desired or required that automatic inputs be overriden; which provides longer life for the components of the system by reducing pressure spikes; and which provides greater operator and vehicle safety.

BRIEF DESCRIPTION OF THE DRAWINGS

FIG. 3 is a schematic of the electronic control system of the invention; and .

DESCRIPTION OF THE PREFERRED EMBODIMENT

Figure 1:
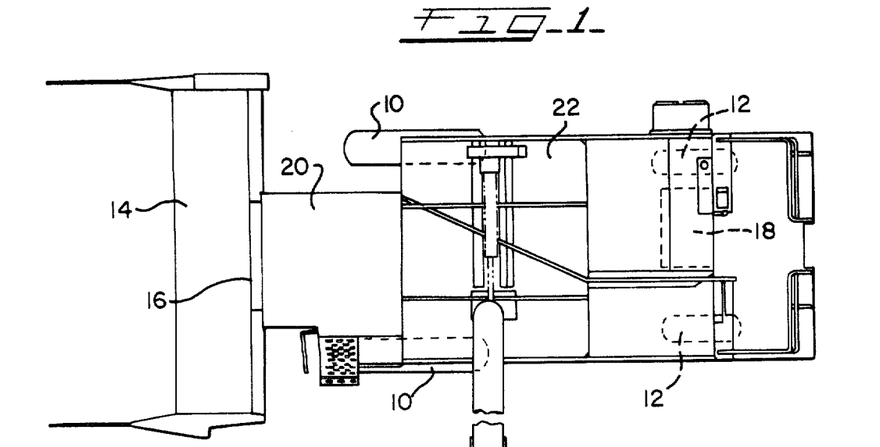
FIG. 1 is a plan view of a self-propelled combine utilizing the drive system of the invention.

FIG. 1 shows a combine having forward main drive wheels 10 and rear steerable auxiliary drive wheels 12. The combine includes a crop harvesting header 14 for gathering the crop and consolidating it laterally for rearward feed by a feeder 16 into a threshing and separating unit (not shown). The combine also includes an engine 18, an operator's station 20, and a grain tank 22 for collection of harvested grain. An actual embodiment of the combine represented in FIG. 1 is a Model 1470 combine produced by the assignee herein.

Figure 2:
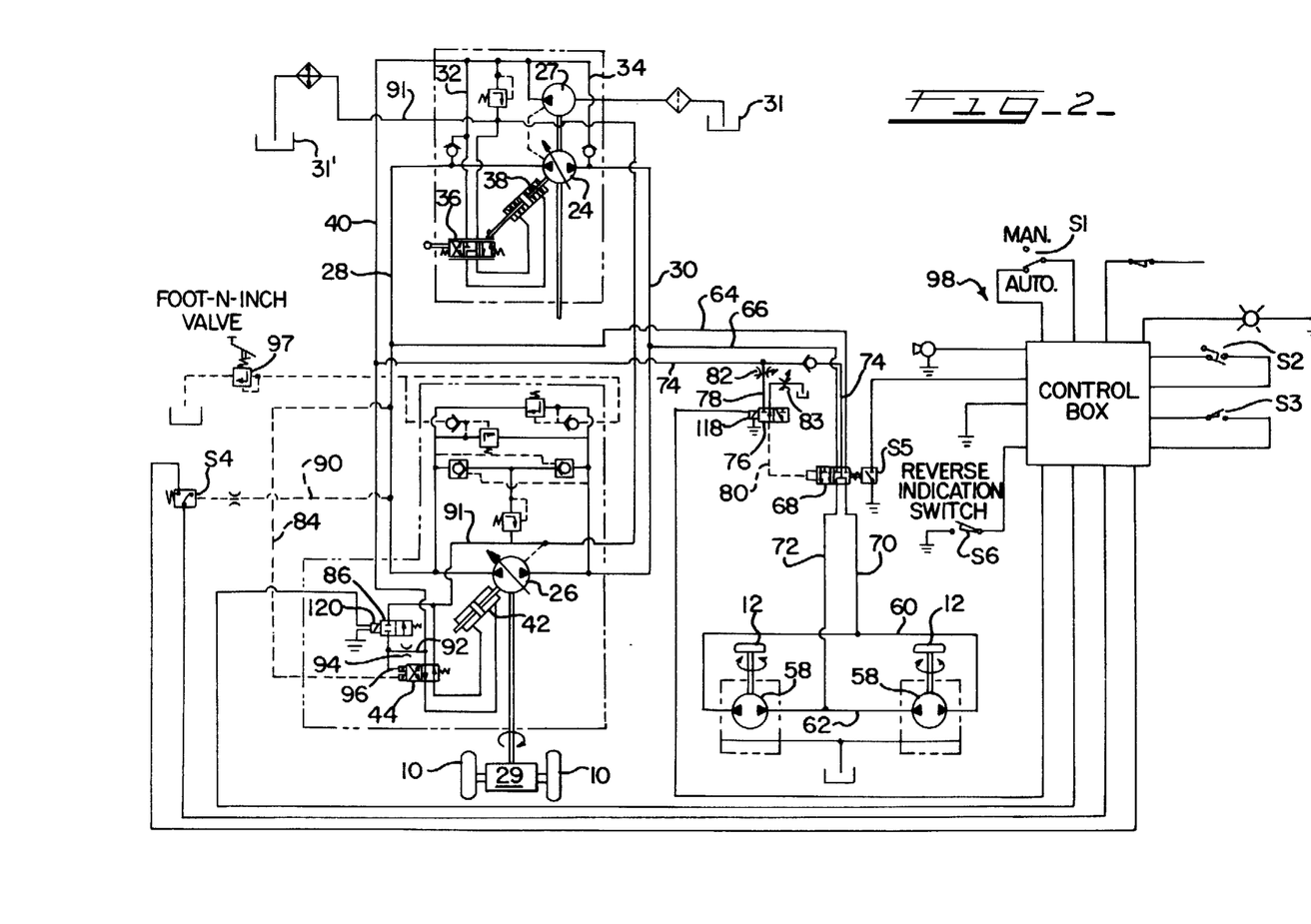
FIG. 2 is a schematic drawing of the hydrostatic drive system and the control system of the invention.

Referring now also to FIG. 2, the basic propulsion drive system for the main drive wheels 10 consists of a variable displacement pump 24 and a variable displacement motor 26 interconnected in a closed loop by a forward line 28 and a reverse line 30. The pump 24 is driven through conventional means by the engine 18 of the combine. Output from the motor 26 is transferred mechanically to a variable ratio transmission and differential unit 29 to the main drive wheels 10. It will, of course, be understood that the drive system includes suitable pressure relief components shown, but not described.

A charge pump 27 is driven with the pump 24 to provide charge pressure fluid from a reservoir 31 to the forward line 28 and reverse line 30 by lines 32 and 34, respectively. Charge pressure is also selectively available through a manual control valve 36 to either side of a servo cylinder 38 for varying the displacement of the pump 24 and to change the direction of output to provide speed change and reverse drive for the combine.

Fluid pressure from the charge pump 27 is available through a line 40 to either side of a servo cylinder 42 for varying the displacement of the motor 26 as controlled by a dual pilot-operated valve 44. The displacement of the motor 26 is variable between 10° and 18° positions of the motor swash plate establishing minimum and maximum strokes of the motor.

The drive system of the invention includes means for driving the rear steerable wheels 12 of the combine. Referring still to FIG. 2, the wheels 12 are driven by respective hydrostatic motors 58 hydraulically connected in parallel by lines 60 and 62. The motors 58 are of fixed displacement reversible type, drivingly connected to the respective wheels 12 by planetary gear final drive units having reduction gear ratios of 34.49 to 1. Lines 64 and 66 are connected respectively from main drive lines 28 and 30 and extend into connection with a pilot-operated control valve 68 of the two-position, four-way type. Lines 70 and 72 interconnect the control valve 68 with the motor lines 60 and 62, respectively. It will thus be seen that the auxiliary drive motors 58 are connected in parallel with the main drive motor 26, with the control valve 68 operable to actuate and deactuate power drive to the motors 58. A line 74 is connected between the charge line 40 and the control valve 68 to interconnect with the lines 70 and 72 when the control valve 68 is in the position shown in FIG. 2. This permits pressure fluid from the charge pump 27 to be available in the auxiliary drive motor circuit to prevent cavitation when the auxiliary drive is disengaged.

The position of the auxiliary drive control valve 68 is controlled by a two-position solenoid valve 76 to which pressure fluid is available through a line 78 from line 74. A pilot line 80 is connected between the solenoid valve 76 and the control valve 68. The solenoid valve 76 is shifted to direct pressure fluid into the pilot line 80 in response to receiving an electrical signal from an electronic control system to be described. A variable restrictor 82 is connected in the line 78, and another variable restrictor 83 between the valve 76 and the reservoir, provide a controlled spool movement of the control valve 68 to prevent shifting of the valve 68 too abruptly.

The displacement of the main drive motor 26 is variable between its 10° and 18° swash plate positions (that is, minimum and full stroke) through two operational inputs. One input is through the actuation of the pilot-operated valve 44 in response to a predetermined fluid pressure received from the main drive system through a pilot line 84 connected to the forward drive line 28. The second input involves actuating the pilot-operated valve 44 in response to a pilot pressure controlled by actuation of a two-position solenoid valve 86. The valve 86 is actuated by a signal from the electronic control system, which, as will be described, is generated in response to actuation of a pressure switch S4 connected by a pilot line 90 to the forward drive line 28 of the main drive system.

The valve 86 is connected on one side to a line 91 which leads to the reservoir 31'. The other side of the valve 86 is connected to the output of the charge pump 27 via a line 92 connected between the line 40 and the valve 86. A restrictor 94 is connected in the line 92. A pilot line 96 extends between the line 92 and the valve 44. The valve 86 is actuated by a signal from the electronic control system shifting the valve to allow fluid flow through line 92 and into line 91. The flow across the restrictor 94 causes a pressure drop in pilot line 96. This permits the spring of the valve 44 to shift the valve 44 to direct fluid into the servo cylinder 42 to shift the swash plate of the motor 26 to minimum displacement (10° position).

It will be seen that the hydrostatic drive system includes suitable pressure relief and pilot-operated valves illustrated in FIG. 2, but not described herein because such valves are conventional in closed loop systems. A so-called "foot-n-inch" valve 97 is provided to release the closed loop pressure to stop the combine in response to depressing a pedal in the combine cab.

Figure 3:
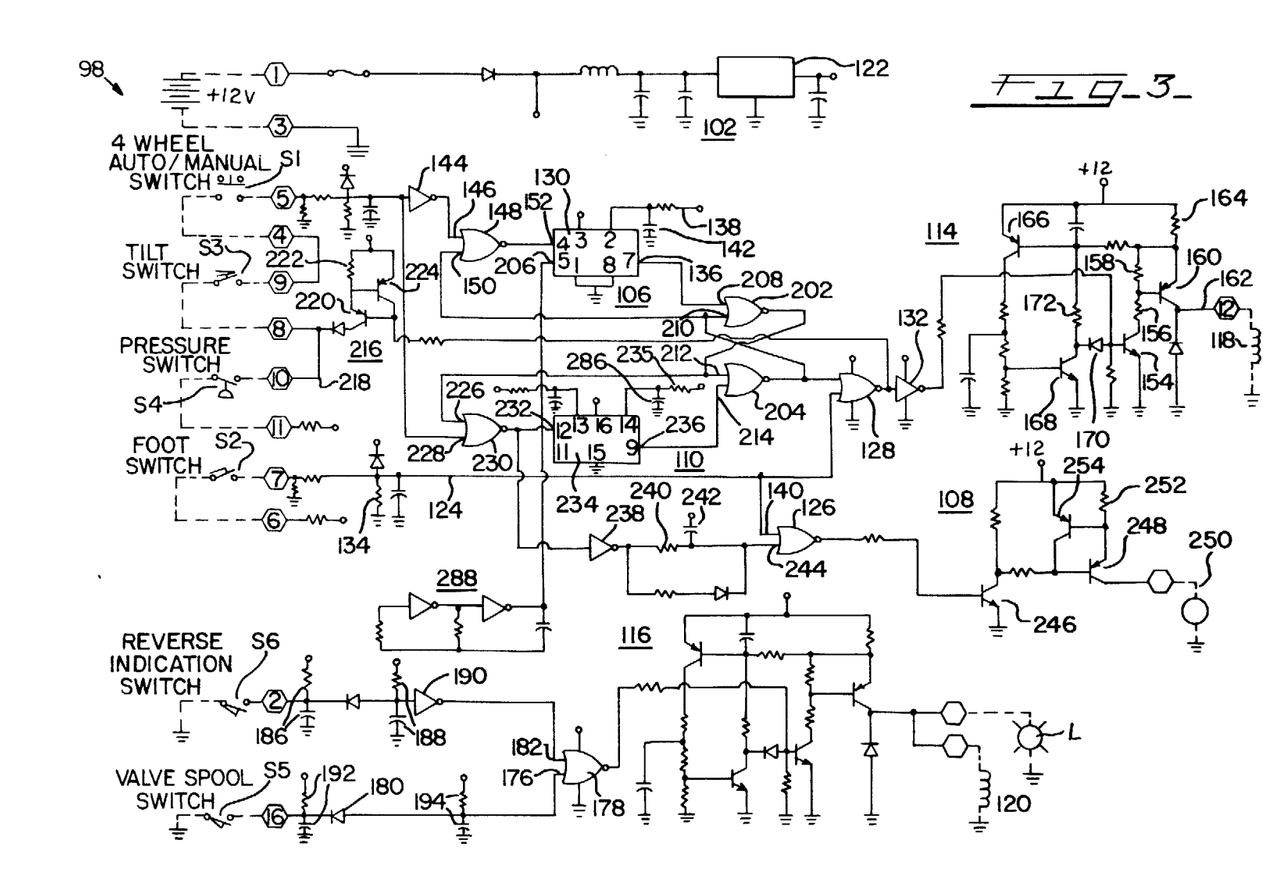

The drive system of the invention is controlled by a unique electronic control system shown in general at 98 in FIG. 2 and in detail in FIG. 3.

The logic control circuitry generally labeled as 98 in FIGS. 2 and 3 is the decision making portion of the four wheel drive shaft control of the invention. The logic control circuitry 98 consists of the following principal subcircuits or portions which will be described in detail hereinbelow; a voltage regulator circuit 102, a PSI (pressure delay two-to-four wheel shift circuit 106, an audible alert circuit 108, a delay four-to-two wheel shift circuit 110, and output drive circuits generally labeled 114 and 116.

The operational interface between the control circuitry 98 and the combine drive system is to actuate a solenoid 118 (of the valve 76) to shift between 2-wheel and 4-wheel drive and to actuate a solenoid 120 (of the valve 86) to change the displacement of the variable motor 26. The manner and circumstances under which these solenoids are actuated will become clear as the description proceeds.

Refering first to the voltage regulator circuit 102, power to the voltage regulator circuit 102 is provided from the combine power source indicated in FIG. 3 as +12 volts DC. As a safety feature, the supply voltage is coupled in series through a mechanical switch (not shown) such that when the combine is in third or road driving gear, shifting from two-to-four wheel drive is prevented. The voltage regulator circuit 102 is of conventional design, including inductors and capacitors to filter the supply input voltage to a voltage regulator integrated circuit (IC) 122 of conventional design. Additional conventional capacitors filter the output of the IC regulator 122 to provide a stable output voltage to prevent any fluctuations in the combine's +12 VDC source from affecting the desired circuit delay times.

A brief description of the various operator-controlled and condition-responsive switches of the control circuitry will preface a more detailed description of the circuitry and its control functions.

A switch S1 in the combine cab enables the operator to select manual or automatic modes of shifting between 2-wheel and 4-wheel drive. A foot switch S2 in the combine cab enables the operator to engage 4-wheel drive at any time, other than when the transmission 29 is in 3rd gear (highest range).

A so-called tilt switch S3 is mounted on the body of the combine and comprises a conventional grade-sensing mercury switch operable to close when the forward climb angle of the combine is about 5° (9%) or greater and to open when the forward climb angle decreases to 2.5° (4%). Accordingly, the switch S3 controls automatic shifting into 4-wheel drive as the combine climbs a hill and controls shifting back into 2-wheel drive as the combine approaches the crest of a hill wherein less drive torque is required.

Switch S4 is operable in response to a predetermined pressure (4,000 psi) in the forward drive line 28 of the hydrostatic drive system to cause shifting into 4-wheel drive when the tilt switch S3 is closed (combine forward climb angle 5° or more).

A switch S5 is mechanically actuated in response to movement of the spool of the control valve 68 to provide a positive signal to the control circuitry of the position of the valve 68.

A switch S6 is operable when the combine transmission 29 is in reverse drive to prevent a change in motor displacement to 10° to maintain maximum torque on the front drive wheels. Reverse drive up a hill is best accomplished when maximum torque is available at the front drive wheels on which most of the machine weight is applied. Without the switch S6, as will become apparent, the automatic shift system could increase the torque of the rear wheels which could spin out and not assist in reverse drive up a hill.

Operation of the manual control of the four wheel drive operation will be explained first. In this mode, foot switch S2 is selectively closed and opened by the operator. When closed, the foot switch S2 couples the voltage from the 12VCD supply and lead 124 to a Nor gate 128. A high or source level supply signal to Nor gate 128 indicates a demand for a four wheel drive mode and this produces a negative voltage at the output pin of the Nor gate 128 which is coupled to the input pin of an inverter 132. Digital designation of a (+) for a high level voltage and (−) for a low or negative will also be used in the following circuit description.

A low (−) signal to the input of inverter 132 permits the output of inverter 132 to go high (+) to energize the valve solenoid 118 through the output drive circuit 114, as will be explained.

When the output of inverter 132 goes high (+), an NPN transistor 154 of drive circuit 114 is biased to conduct. When transistor 154 conducts, the collector of 154 is pulled low. A resistor divider network 156 and 158 then causes a PNP transistor 160 to conduct thus energizing the valve solenoid 118 through conductor 162.

The output drive circuit is protected from overcurrent damaging the control in the event of a short circuit in the conductor 162 or valve solenoid 118, as will be explained. The current required to energize solenoid 118 is supplied through resistor 164. When this current exceeds a given value, the voltage drop across resistor 164 will cause a PNP transistor 166 to conduct. This will in turn cause the NPN transistor 168 to conduct, pulling the collector of transistor 168 low. This stops conduction of transistor 154 by pulling the base of 154 low through diode 170. Transistor 168 also forces conduction of transistor 166 through resistor 172, thus forcing transistor 154 to remain off. This will stop the conduction of transistor 160 and de-energize the valve solenoid 118. The output transistor will remain off (nonconducting) until the 12VDC supply is removed (for instance, by turning the combine key switch off). Reapplying the 12VDC supply power will reinitiate the circuit.

Refer now to the motor engagement drive circuit 116. Upon activation of the valve solenoid 118, which moves the valve spool of the valve 68 (FIG. 2), the limit switch S5 is activated. This valve spool switch closure places a low (−) on input 176 of an NOR gate 178 through diode 180. As long as a low (−) is on input 182 of the NOR gate 178, the output of NOR gate 178 will go high (+) and activate the motor solenoid 120 through output drive circuit 116. The output drive circuit 116 is substantially identical to the output drive circuit 114, with the inclusion of a lamp indicator L.

The operation of the circuit will therefore not be repeated.

The reverse indication switch S6 is incorporated to allow maximum torque in the reverse direction although the speed in the reverse direction is reduced. With the combine traveling in a forward direction the reverse indication switch S6 will be open allowing RC networks 186 and 188 to charge the capacitors thereof producing a high (+) at the input of inverter 190. This will produce a low (−) at the output of inverter 190 and at the input 182 of NOR gate 178, upon placing the combine in reverse (by actuating the control 36) the reverse indication switch S6 will close discharging the capacitors associated with RC networks 186 and 188. This will produce a low on the input of inverter 190 causing a high on the output of inverter 190 and on the input 182 of NOR gate 178. This will prevent a change in motor displacement to minimum displacement (10°) while traveling in reverse. RC networks 186 and 188 are used for input filtering as is RC network 192.

RC network 194 is used to delay the change in motor displacement upon shifting from four to two wheel drive. When four wheel drive is no longer required in either manual or automatic operation, the valve solenoid 118 is de-energized. This in turn opens the valve spool switch S5. This causes diode 180 to be reverse biased allowing the capacitor in the RC network 194 to charge placing a high (+) on the input 176 of NOR gate 178 after three tenths of a second. A high on input 176 of NOR gate 178 causes the output of NOR gate 178 to go low (−). This de-energizes the motor displacement solenoid 120 through the output drive circuitry 116. It will be seen that the combine will be retained in four-wheel drive until the foot switch S2 is released by the operator.

The foregoing completes the description of the manual controlled operation mode of the control system 98 of FIG. 3. As might be expected, the automatic operation mode of the logic control system 98 utilizes a majority of the same circuitry as the manual controlled mode operation.

Refer now to the automatic operation of the four wheel drive logic circuit 98. As mentioned, switch S1 is movable to select the two wheel or four wheel drive mode. In the two wheel position of switch S1, the machine will remain in the two wheel drive mode unless the operator operates the foot switch S2 which will then initiate the operation described above.

In the four wheel position of switch S2, the control logic circuit 98 will automatically determine the type of drive desired. Switch S2 is electrically coupled in series with tilt switch S3 and the 4000 psi pressure switch S4. Tilt switch S3, as the name implies, is actuated by the position or attitude of the machine relative to horizontal in the direction of travel of the combine. For example, when the machine is moving up an incline of five degrees (5°) or more, the tilt switch S3 will be closed. When the machine is moving up an incline or over ground conditions which produce an increased propulsion load, the pressure in line 28 (FIG. 2) will increase because of the increased load on the combine drive system which will close the pressure switch S4. When both the tilt switch S3 and the pressure switch S4 are closed, the control circuit 98 will initiate a timing sequence to place the machine in the four wheel drive mode by energizing the valve solenoid 118 and the motor solenoid 120.

Assume then, that switch S1 is in the four wheel drive position, the machine is moving up an incline and hence, switches S3 and S4 are closed to cause the machine to automatically shift from a two wheel drive mode to the four wheel drive mode. In this state, a high level voltage will be coupled through switches S4, S3 and S2 to inverter 144 to initiate the four wheel drive mode of operation. A high (+) level input to inverter 144 produces a low voltage level at the output of the inverter 144 which is coupled to input 146 of an NOR gate 148. Input 150 of NOR gate 148 is controlled by a flip flop made up of NOR gates 202 and 204. This flip flop determines the energized or deenergized state of the valve solenoid 118 as determined by the automatic mode of operation. Input 150 of NOR gate 148 will remain low (−) at any time the automatic mode of operation is not energizing the valve solenoid 118, as determined by a low (−) at the output of NOR gate 204. With the input 150 of the NOR gate 148 low (−), a low (−) on input 146 of NOR gate 148 will produce a high (+) on the output of NOR gate 148. This high (+) at the output of NOR gate 148 produces a high (+) at the non-inverting input 152 of a monostable multi-vibrator 130. The inverting input 206 of the multivibrator 130 is controlled by an oscillator circuit 288. The oscillator circuit 288 continuously reinitializes the timing circuit 106 as long as input 152 of the monostable multi-vibrator 130 is held low (−). Once input 152 of the monostable vibrator 130 goes high (+) the input 206 from the oscillator circuit 288 is ignored.

The high (+) on input 152 of monostable multivibrator 130 starts the time delay associated with circuit 106. The time delay is determined by resistor 138 and capacitor 142. When input 152 is continuously held high (+) for one and one half seconds, output 136 of monostable multi-vibrator 130 will go high (+). A high (+) at the output 136 of monostable multi-vibrator 130 will produce a high (+) at input 208 of NOR gate 202. This high (+) at input 208 will cause the output of NOR gate 202 to go low (−). The low (−) at the output of NOR gate 202 will force a low on input 212 of NOR gate 204. As long as input 214 of NOR gate 204 is low, a low on input 212 of NOR gate 204 will cause the output of 204 to go high energizing the valve solenoid 118 and motor solenoid 120 through the output driver circuitry 114 and 116 respectively, as previously described. At the same time, the high (+) on the output of NOR gate 204 will place a low on the output of NOR gate 128 which in turn will activate a driver circuit 216 which will electrically bypass the pressure switch S4. This will prevent system pressure fluctuations from influencing the effect of the control logic, and hence, tends to maintain a smooth driving action. Once the logic circuitry 98 has activated four wheel drive, the requirement of maintaining a minimum pressure of 4000 psi on line 28 (FIG. 2) therefore no longer exists. Pressure switch S4 is electrically bypassed by placing a high (+) on the conductor 218 between the pressure switch S4 and tilt switch S3.

As the output of NOR gate 128 goes low (−), PNP transistor 220 in the driver circuit 216 is forced to conduct. This causes the collector of transistor 220 to conduct current. The driver circuit 216 has current limiting protection to prevent damage to the transistor 220 in the event excessive current is required due to a short circuit condition. The current required to maintain a high (+) state on the collector of transistor 220 is supplied through a resistor 222. When the voltage drop across resistor 222 reaches an adequate level, transistor 224 will conduct thus limiting the current through transistor 220.

When the output of NOR gate 204 goes high (+), initiating four wheel drive, the input 210 of NOR gate 202 will go high (+). This will prevent a change of state at input 208 of NOR gate 202 from having any further effect on the operation of the output driver circuitry 114.

Once in four wheel drive, the logic control circuitry will maintain four wheel drive until the tilt switch S3 or the auto/manual operator selectable switch S1 is open continuously for two seconds.

With the output of NOR gate 202 forced low (−) at the same time the valve solenoid 118 is energized, as previously described, input 226 of NOR gate 230 will be forced low (−). This will allow a low (−) on input 228 of NOR gate 230 to initiate the time delay circuit 110 by causing the output of NOR gate 230 and likewise input 232 of monostable multi-vibrator 234 to go high (+). Input 228 of NOR gate 230 will go low (−) at any time switch S1 or switch S3 is opened. The operation of the time delay circuit 110 is identical to the operation of the time delay circuit 106 previously described. The two second time delay is determined by resistor 235 and capacitor 286.

A continuous two second period of the tilt switch S3 or auto/manual operator selectable switch S1 being open will produce a high (+) on output 236 of monostable multivibrator 234. This high (+) on the circuit 236 of monostable multivibrator 234 will force a high (+) on input 214 of NOR gate 204. A high (+) on input 214 of NOR gate 204 produces a low (−) on the output of NOR gate 204 and likewise on the input 210 of NOR gate 202. At this time input 208 of NOR gate 202 will be low (−) since, as previously described switches S1, S3 and S4 must all be closed for a period of one and one half seconds before input 208 of NOR gate 202 will go high (+).

With inputs 208 and 210 of NOR gate 202 low (−), the output of NOR gate 202 will go high (+). This high (+) at the output of NOR gate 202 will produce a high (+) at input 212 of NOR gate 204 maintaining a low (−) at the output of NOR gate 204. This low (−) at the output of NOR gate 204 will de-energize the valve solenoid 118 as previously described and cause a shift from four wheel drive to two wheel drive.

An audible alert 250 is incorporated in the system to give the operator an advanced warning as to when the machine is going to shift from four wheel drive to two wheel drive. This is to allow him to adjust his forward speed to compensate for the slight increase in speed caused by the automatic shift.

When the output of NOR gate 230 goes high (+) a two second time delay is initiated for shifting from four wheel drive to two wheel drive as previously described. At the same time a one half second time delay is initiated which delays the audible alert 250 from sounding. The difference in these delays (one and one half seconds) is the time the audible alert is activated, as will be described.

When the output of NOR gate 230 goes high (+), the input to inverter 238 is pulled high (+). A high (+) on the input of inverter 238 will produce a low (−) on the output of inverter 238. Resistor 240 and capacitor 242 will cause a one half second delay before the input 244 of NOR gate 126 is at a low (−) state. As long as input 140 of NOR gate 126 is low (−) the output of NOR gate 126 will go high (+) when input 244 of NOR gate 126 goes low (−). This high (+) on the output of NOR gate 126 will activate the audible alert 250 through the driver circuit 108, as will be explained.

Input 140 of NOR gate will be low (−) when the foot switch S2 is not activated, thus allowing the audible alert to sound when shifting from four wheel drive to two wheel drive as explained previously. Upon closure of foot switch S2 to actuate four wheel drive, input 140 of NOR gate 126 will go high (+) forcing the output of NOR gate 126 low (−). A low on the output of NOR gate 126 will disable the audible alert. This feature is to eliminate the audible alert 250 from sounding in the event the operator overrides the automatic control.

A high (+) on the output of NOR gate 126 will cause the NPN transistor 246 to conduct. When transistor 246 conducts the collector of transistor 246 is pulled low (−). This will cause the PNP transistor 248 to allow current flow to the audible alert 250.

The driver circuit 108 has current limiting protection to prevent damage to the PNP transistor 248 in the event excessive current is required due to a short circuit condition at the audible alert 250. The current to the audible alert 250 is supplied through a resistor 252. When the voltage drop across resistor 252 reaches an adequate level, a transistor 254 will conduct thus limiting the current through transistor 248.

A low (−) at the output of NOR gate 126 will prevent conduction of NPN transistor 246, and in turn stop conduction of PNP transistor 248. With transistor 248 not conducting, current will not flow to audible alert 250.

The audible alert 250 is automatically deactivated when shifting from four wheel drive to two wheel drive has occurred. The output of NOR gate 202 is forced high (+) when the valve solenoid 118 is deenergized as previously explained. This high (+) at the output of NOR gate 202 will place a high (+) on the input 226 of NOR gate 230, thus forcing a low (−) on the output of NOR gate 230. This low (−) on the output of NOR gate 230 will produce a high on the output of inverter 238 and likewise the input 244 of NOR gate 126 turning off the audible alert.

Figure 4:
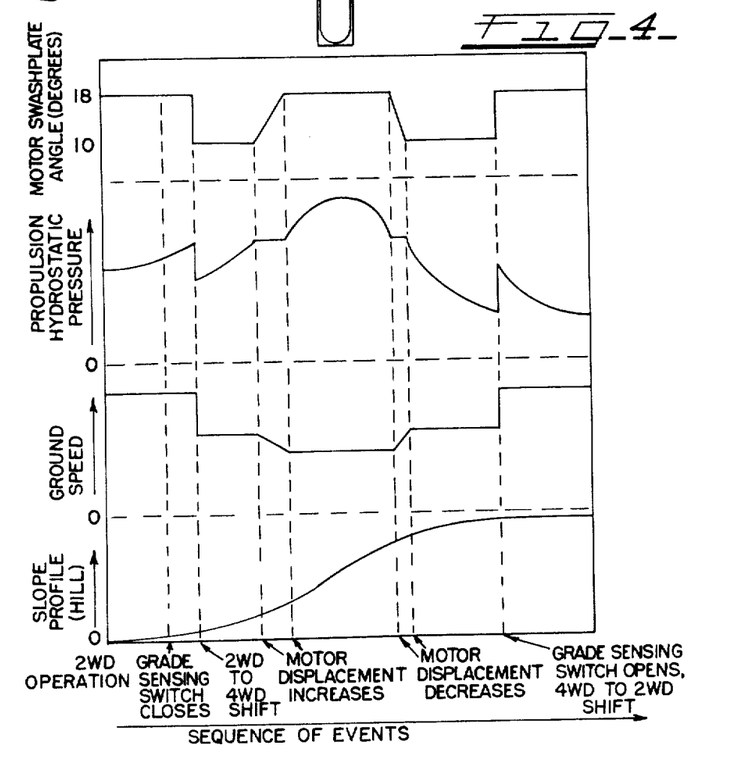
FIG. 4 is a graph showing performance characteristics of the drive system of the invention.

A summary of the operation of the drive system of the invention can perhaps best be seen with reference to FIG. 4.

The bottom of FIG. 4 shows a slope profile of a hill traversed by a combine. The automatic sequence of events in the operation of the transmission and the controls are shown thereabove, as the combine moves up the hill. The changes in vehicle ground speed, hydrostatic pressure, and variable motor swash plate angle are depicted for each event displayed along the horizontal axis and are believed to be readily understood.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a crop harvester having a pair of forward main drive wheels and a pair of rear steerable wheels, a drive system comprising:
   a hydrostatic drive including a pump and a variable displacement motor cooperatively arranged to drive the main drive wheels;
   auxiliary drive means operable from said hydrostatic drive for driving said rear wheels; and
   control means for reducing the displacement of said variable motor in response to actuation of said auxiliary drive means to thus provide additional fluid to said auxiliary drive means and minimize crop harvester speed change as the auxiliary drive means is actuated.

2. The subject matter of claim 1, including further control means for deactuating said auxiliary drive means in response to sensing a forward climb angle of the crop harvester less than a predetermined angle.

3. In a crop harvester having main drive wheels and auxiliary drive wheels, a drive system comprising:
   a hydrostatic drive including a pump and a variable displacement motor cooperatively arranged to drive the main drive wheels;
   auxiliary drive means operable from said hydrostatic drive for driving said auxiliary drive wheels; and
   control means for deactuating said auxiliary drive means in response to sensing a forward climb angle of the crop harvester less than a predetermined angle.

4. The subject matter of claim 3, including control means for increasing the displacement of said variable motor in response to deactuation of said auxiliary drive means whereby maximum torque is available in the hydrostatic drive.

5. In a combine particularly adapted to operate on hilly terrain and having a pair of forward main drive wheels and a pair of steerable rear drive wheels, a drive system comprising:
   a hydrostatic drive including a pump and a variable displacement motor cooperatively arranged to drive the main drive wheels;
   auxiliary drive means operable from said hydrostatic drive for driving said rear drive wheels;
   means for actuating said auxiliary drive means in response to sensing fluid pressure in said hydrostatic driven having risen to a predetermined pressure under the influence of an increased degree of slope being traversed or other increase of the load on the combine; and
   means for reducing the displacement of said variable motor in response to actuating said auxiliary drive means thereby providing additional fluid for said auxiliary drive means and minimizing combine speed change.

6. The subject matter of claim 5, including means effective during drive of the main wheels and rear wheels for increasing the displacement of said motor in response to sensing fluid pressure in said hydrostatic drive having risen to a predetermined pressure under the influence of increasing loads on the combine.

7. In a combine particularly adapted to operate on hilly terrain and having a pair of forward main drive wheels and a pair of steerable rear drive wheels, a drive system comprising:
   a hydrostatic drive including a pump and a variable displacement motor cooperatively arranged to drive said main drive wheels;

a pair of auxiliary hydraulic motors for driving said rear steerable wheels;

means operative to selectively drive said auxiliary motors from said hydrostatic drive;

a control system for automatically actuating and deactuating said auxiliary hydraulic motors, said control system including means for actuating said auxiliary hydraulic motors in response to sensing a predetermined pressure in said hydrostatic drive and means for deactuating said auxiliary hydraulic motors in response to sensing a predetermined minimum forward climb angle of said combine, whereby said rear wheels may be automatically driven as the combine climbs a hill and automatically disengaged as the combine approaches level ground.

8. The subject matter of claim 7, wherein said control system further includes means for reducing the displacement of said variable motor in response to actuating said auxiliary motors, thereby providing additional fluid to said auxiliary motors and minimize combine speed change during actuation of the auxiliary drive motors.

9. In a vehicle having main drive wheels and auxiliary drive wheels, a drive system comprising:

a hydrostatic drive including a pump and a variable displacement motor cooperatively arranged to drive the main drive wheels;

auxiliary drive means operable from said hydrostatic drive for driving said auxiliary drive wheels; and control means for reducing the displacement of said variable motor in response to actuation of said auxiliary drive means to thus provide additional fluid to said auxiliary drive means and minimize vehicle speed change as the auxiliary drive means is actuated.

10. The subject matter of claim 9, wherein said control means includes means for effecting a time delay between actuation of said auxiliary drive and reduction of the displacement of said motor, whereby fluid flow to said auxiliary drive is commenced before the motor displacement is reduced to further minimize vehicle speed change as the auxiliary drive is actuated.

11. The subject matter of claim 9, including further control means for deactuating said auxiliary drive means in response to sensing a forward climb angle of the vehicle less than a predetermined angle.

12. The subject matter of claim 11, including means for actuating said auxiliary drive means at the option of the operator to engage said auxiliary drive wheels regardless of the forward climb angle of the vehicle.

13. In a vehicle having main drive wheels and auxiliary drive wheels, a drive system comprising:

a hydrostatic drive including a pump and a variable displacement motor cooperatively arranged to drive the main drive wheels;

auxiliary drive means operable from said hydrostatic drive for driving said auxiliary drive wheels; and control means for deactuating said auxiliary drive means in response to sensing a forward climb angle of the vehicle less than a predetermined angle.

14. The subject matter of claim 13, including control means for increasing the displacement of said variable motor in response to deactuation of said auxiliary drive means whereby maximum torque is available in the hydrostatic drive.

15. The subject matter of claim 14, including control means for introducing an automatic time delay between deactuation of said auxiliary drive means and increase of the displacement of said motor, whereby fluid flow to said auxiliary drive is stopped before the motor displacement is increased to minimize vehicle speed change as the auxiliary drive is deactuated.

16. The subject matter of claim 13, including means for actuating said auxiliary drive means at the option of the operator to engage said auxiliary drive wheels regardless of the forward climb angle of the vehicle.

17. In a vehicle having main drive wheels and auxiliary drive wheels, a drive system comprising:

a hydrostatic drive including a pump and a variable displacement motor cooperatively arranged to drive the main drive wheels;

auxiliary drive means operable from said hydrostatic drive for driving said auxiliary drive wheels;

means for actuating said auxiliary drive means in response to sensing a predetermined fluid pressure in said hydrostatic drive; and means for reducing the displacement of said variable motor in response to actuating said auxiliary drive means thereby providing additional fluid for said auxiliary drive means and minimizing vehicle speed change.

18. The subject matter of claim 17, wherein said control means includes means for effecting an automatic time delay actuation of said auxiliary drive and reduction of the displacement of said motor, whereby fluid flow to said auxiliary drive is commenced before the motor displacement is reduced to further minimize vehicle speed change as the auxiliary drive is actuated.

19. The subject matter of claim 17, including means effective during drive of the main and auxiliary drive wheels for increasing the displacement of said motor in response to sensing a predetermined fluid pressure in said hydrostatic drive thereby increasing the torque available in the hydrostatic drive.

20. The subject matter of claim 17, including control means for deactuating said auxiliary drive means in response to sensing a forward climb angle of the vehicle less than a predetermined angle.

21. The subject matter of claim 20, including means for actuating said auxiliary drive means at the option of the vehicle operator to engage said auxiliary drive wheels regardless of the fluid pressure in said hydrostatic drive or the forward climb angle of the vehicle.

22. In a vehicle having a pair of forward main drive wheels and a pair of rear steerable wheels, a drive system comprising:

a hydrostatic drive including a pump and a variable displacement motor cooperatively arranged to drive said main drive wheels;

a pair of auxiliary hydraulic motors for driving said rear steerable wheels;

valve means operative to selectively drive said auxiliary motors from said hydrostatic drive;

a control system for automatically actuating and deactuating said auxiliary hydraulic motors, said control system including means for actuating said auxiliary hydraulic motors in response to sensing a predetermined pressure in said hydrostatic drive and means for deactuating said auxiliary hydraulic motors in response to sensing a predetermined minimum forward climb angle to said vehicle, whereby said rear wheels may be automatically driven as the vehicle climbs a hill and automatically disengaged as the vehicle approaches level ground.

23. The subject matter of claim 22, wherein said control system further includes means for reducing the displacement of said variable motor in response to actuating said auxiliary motors, thereby providing additional fluid to said auxiliary motors and minimize vehicle speed change during actuation of the auxiliary drive motors.

24. The subject matter of claim 22, wherein said control system includes means for actuating said auxiliary motors for driving said rear wheels at the option of the vehicle operator regardless of the fluid pressure in said hydrostatic drive or the forward climb angle of the vehicle whereby the vehicle operator can insure drive to all wheels where conditions or events require.

25. In a drive system for a vehicle having main fluid drive means and auxiliary fluid drive means for driving said vehicle, said auxiliary drive means being selectively operable, an electronic control system for controlling said drive system dependent upon the attitude of the vehicle and the effective vehicle load, said control system comprising in combination, tilt switch means responsive to the attitude of the vehicle and being activatable when the vehicle is at an attitude greater than a preselected angle, pressure switch means responsive to fluid pressure of the main fluid drive means and hence the load thereon, means for electrically coupling said tilt switch means and pressure switch means to provide a control signal to enable activation of said control system when both said switch means are activated, first delay means for delaying said control signal from said tilt switch means and said pressure switch means to provide a first delay signal, and said drive means being activatable by said delay signal.

26. The subject matter of claim 25 further including second delay means for further delaying said delay signal and providing a first output for selectively activating said main drive means after an additional time period delay to allow sufficient fluid flow to the auxiliary drive means before the main drive means increases forward speed whereby a smoother shift is obtained when the auxiliary drive means is activated.

27. The subject matter of claim 26 further including third delay means, said third delay means connected to said second delay means and being activated when said first output from said second delay means is terminated, said third delay means providing a signal to continue to activate said main drive means for a designated period whereby an additional time period to allow the fluid flow to the wheels associated with the auxiliary drive means to cease.

28. The subject matter of claim 25 further including electronic switch means for electrically bypassing said pressure switch means, said electronic switch means being activated by a signal indicating auxiliary drive means activation, said electronic switch means providing a time delay action to maintain the control system activated even though said pressure switch is momentarily opened such as by arbitrary movement of the vehicle and fluctuations in said fluid pressure.

29. The subject matter of claim 25 further including operator controlled switch means for overriding and bypassing said tilt switch means and said pressure switch means to manually activate said control system.

30. In a vehicle having main drive wheels and auxiliary drive wheels, a drive system comprising:
a reversable hydrostatic drive including a reversable pump and a variable displacement motor cooperatively arranged to drive the main drive wheels selectively in forward and reverse drive;
auxiliary drive means operable from said hydrostatic drive for driving said auxiliary drive wheels;
control means for reducing the displacement of said variable motor in response to actuation of said auxiliary drive means to thus provide additional fluid to said auxiliary drive means and minimize vehicle speed change as the auxiliary drive means is actuated; and
means for maintaining full displacement of said variable motor when the hydrostatic drive is in reverse drive.

* * * * *